US007040795B2

(12) United States Patent
Puleo, Sr.

(10) Patent No.: US 7,040,795 B2
(45) Date of Patent: May 9, 2006

(54) FIBER OPTIC CHRISTMAS TREE STAND

(75) Inventor: Salvatore J. Puleo, Sr., Watchung, NJ (US)

(73) Assignee: NCP Corporation, Cranford, NJ (US)

( * ) Notice: Subject to any disclaimer, the term of this patent is extended or adjusted under 35 U.S.C. 154(b) by 0 days.

(21) Appl. No.: 10/714,765

(22) Filed: Nov. 17, 2003

(65) Prior Publication Data

US 2004/0170029 A1    Sep. 2, 2004

Related U.S. Application Data

(63) Continuation-in-part of application No. 09/978,217, filed on Oct. 15, 2001, now Pat. No. 6,648,497.

(60) Provisional application No. 60/261,562, filed on Jan. 15, 2001.

(51) Int. Cl.
*G02B 6/42* (2006.01)
*F21V 15/01* (2006.01)

(52) U.S. Cl. ........................ 362/565; 362/375; 362/581

(58) Field of Classification Search ........ 362/563–568, 362/122–123, 806, 375, 581, 554, 556
See application file for complete search history.

(56) References Cited

U.S. PATENT DOCUMENTS

| 1,134,878 A | | 9/1915 | Laszczak | |
|---|---|---|---|---|
| 1,558,570 A | | 10/1925 | Adams | |
| 1,637,072 A | | 7/1927 | Conover | |
| 1,999,579 A | * | 4/1935 | Squier | 455/230 |
| 2,279,182 A | * | 4/1942 | Snyder | 40/431 |
| 2,298,518 A | * | 10/1942 | Thorne | 200/61.68 |
| 2,416,802 A | * | 3/1947 | Roung | 47/40.5 |
| 2,905,414 A | | 9/1959 | Ziarden | 248/44 |
| 2,980,377 A | | 4/1961 | Nielsen et al. | 248/44 |
| 3,119,588 A | | 1/1964 | Hollman | 248/44 |
| 3,141,713 A | * | 7/1964 | Kauffman | 312/328 |
| 3,465,139 A | | 9/1969 | Siegal | 240/10 |
| 3,536,908 A | * | 10/1970 | Oster | 40/431 |
| 3,564,233 A | | 2/1971 | Corr et al. | 240/10 |
| 3,660,798 A | * | 5/1972 | Marzec | 439/136 |
| 3,766,376 A | * | 10/1973 | Sadacca et al. | 40/433 |
| 3,768,376 A | | 10/1973 | Sadacca et al. | 240/10 |
| 3,910,617 A | * | 10/1975 | Scalza et al. | 292/341.16 |
| 4,034,215 A | | 7/1977 | Hashimoto | 240/10 |

(Continued)

FOREIGN PATENT DOCUMENTS

DE    4118695 A1    12/1992

(Continued)

*Primary Examiner*—Alan Cariaso
*Assistant Examiner*—Jason Han
(74) *Attorney, Agent, or Firm*—Brian K. Johnson, Esq., LLC (57) ABSTRACT

A Christmas tree stand has a base for supporting the stand above a ground level and a shell having a lateral surface. The shell is disposed atop the base so as to define an inner volume and the shell houses electrical components within the inner volume. The shell has a plurality of holes disposed on a top portion of the lateral surface that provide ventilation between the inner volume and an outside environment. Further, the shell has a flange overhanging the top portion of the lateral surface so as to shield the holes. A base may also be provided for the Christmas tree stand including an elevated surface and a support structure for supporting the elevated surface above the ground level. Finally, the elevated surface may define one surface of the inner volume. Other thermodynamically efficient configurations are provided. Certain safety mechanisms are provided in relation to modular electronics platforms.

4 Claims, 10 Drawing Sheets

U.S. PATENT DOCUMENTS

| | | | | |
|---|---|---|---|---|
| 4,068,118 A | | 1/1978 | Carrington | 382/123 |
| 4,097,917 A | * | 6/1978 | McCaslin | 362/565 |
| 4,125,781 A | | 11/1978 | Davis, Jr. | 307/11 |
| 4,349,864 A | | 9/1982 | Smith | |
| 4,428,988 A | * | 1/1984 | Adinamis | 428/8 |
| 4,612,219 A | | 9/1986 | Tengs et al. | 428/8 |
| 4,686,611 A | | 8/1987 | Von Kohorn | |
| 4,747,022 A | * | 5/1988 | Lin | 362/565 |
| 4,777,571 A | | 10/1988 | Morgan | 382/123 |
| 4,825,586 A | * | 5/1989 | Coppedge | 47/40.5 |
| 4,858,086 A | * | 8/1989 | Pietrantonio et al. | 362/123 |
| 4,878,157 A | | 10/1989 | Koch | 362/123 |
| 5,054,236 A | | 10/1991 | Sands | 47/79 |
| 5,103,380 A | | 4/1992 | Lindner et al. | 362/32 |
| 5,104,608 A | * | 4/1992 | Pickering | 362/568 |
| 5,109,323 A | * | 4/1992 | Waycaster | 362/217 |
| D326,626 S | | 6/1992 | McKnight | D11/118 |
| 5,121,897 A | * | 6/1992 | Sofy | 248/527 |
| 5,161,874 A | * | 11/1992 | Benes | 362/552 |
| 5,226,709 A | | 7/1993 | Labranche | 362/32 |
| 5,230,555 A | * | 7/1993 | Stephenson et al. | 362/572 |
| 5,306,366 A | | 4/1994 | Shattan | 156/61 |
| 5,422,797 A | | 6/1995 | Shattan | 362/123 |
| 5,484,180 A | * | 1/1996 | Helmar | 292/341.16 |
| 5,508,901 A | * | 4/1996 | Kuo | 362/122 |
| 5,510,964 A | * | 4/1996 | Spitler et al. | 362/217 |
| 5,517,390 A | | 5/1996 | Zins | 362/123 |
| 5,526,249 A | * | 6/1996 | Karasawa et al. | 362/362 |
| 5,527,010 A | | 6/1996 | Kao | 248/519 |
| 5,558,422 A | | 9/1996 | Sanford | 362/32 |
| 5,639,157 A | | 6/1997 | Yeh | 362/123 |
| 5,655,877 A | * | 8/1997 | Yu | 416/5 |
| 5,688,040 A | * | 11/1997 | Klees | 362/163 |
| 5,702,170 A | * | 12/1997 | Broderick | 362/568 |
| 5,707,037 A | * | 1/1998 | Pastrick | 248/516 |
| 5,722,763 A | * | 3/1998 | Chen | 362/163 |
| 5,779,353 A | * | 7/1998 | Kacheria | 362/293 |
| 5,820,248 A | | 10/1998 | Ferguson | 362/123 |
| 5,829,863 A | * | 11/1998 | Gutshall | 362/123 |
| 6,017,142 A | * | 1/2000 | Harris, Jr. | 362/564 |
| 6,030,093 A | * | 2/2000 | Draper | 362/161 |
| 6,039,453 A | * | 3/2000 | Wang | 362/101 |
| 6,050,714 A | * | 4/2000 | Isabella | 362/568 |
| 6,128,854 A | * | 10/2000 | Chaney | 47/39 |
| 6,299,225 B1 | * | 10/2001 | Chang | 292/341.16 |
| 6,382,582 B1 | * | 5/2002 | Brown | 248/521 |
| 6,386,728 B1 | * | 5/2002 | Colonna | 362/123 |
| 6,438,879 B1 | * | 8/2002 | Kao | 40/431 |
| 6,739,746 B1 | * | 5/2004 | Tang | 362/568 |
| 6,830,365 B1 | | 12/2004 | Kao | |

FOREIGN PATENT DOCUMENTS

| | | |
|---|---|---|
| JP | 06159739 A | 6/1994 |
| JP | 04273286 A | 9/2002 |

* cited by examiner

FIG. 8

FIBER OPTIC CHRISTMAS TREE STAND

CROSS-REFERENCE TO RELATED APPLICATIONS

This application is a continuation-in-part of U.S. patent application Ser. No. 09/978,217, filed Oct. 15, 2001, now U.S. Pat. No. 6,648,497, which claims the benefit of the U.S. Provisional Patent Application having Ser. No. 60/261,562 and filed on Jan. 15, 2001, both the disclosures of which are incorporated by reference in their entirety herein.

FIELD OF THE INVENTION

The present invention relates to the field of Christmas tree stands, and in particular, to Christmas tree stands, suitable for outdoor use, that support artificial, fiber optic Christmas trees and house the electronic components needed for such.

The present invention further relates to the field of fiber optic lighted displays having conveniently-replaceable electronic components within the displays, and in particular, to lighted displays having safety mechanisms that preclude access to those electronic components when power is applied to them.

BACKGROUND OF THE INVENTION

Christmas tree stands having a variety of characteristics have been developed for supporting artificial, fiber optic Christmas trees. In addition to supporting the Christmas tree, these stands also typically house some or all of the electrical components used to illuminate the fiber optics of the tree. An example of such a Christmas tree stand is shown in U.S. Pat. No. 5,820,248 ("Ferguson"). Ferguson discloses a fiber optic Christmas tree stand having an inner cavity for holding a number of electrical components that illuminate the tree's fiber optics. Ferguson's tree stand also includes a plurality of air vents that permit the heat generated within the cavity to be vented to the outside environment.

Another example of a fiber optic Christmas tree stand is provided in U.S. Pat. No. 5,829,863 ("Gotshall"). Gotshall discloses a circular Christmas tree base having a number of electrical components and switches disposed on the exterior of the base that control the illumination and musical effects provided with the Christmas tree base. As with Ferguson, a plurality of apertures are included in the periphery of the base housing to provide ventilation for the lamp, motor and color wheel assembly disposed within the tree base.

An artificial, fiber optic Christmas tree of a slightly different design is disclosed in U.S. Pat. No. 5,517,390 ("Zins"). Zins' fiber optic Christmas tree includes a base or stand that supports a main tree trunk from which the fiber optically illuminated branches of the artificial tree extend. Zins further discloses a plurality of cooling vents disposed on the tree trunk itself for ventilating the heat generated by the fiber optic light sources within the tree branches. A cooling fan is provided for within the interior of the main trunk that circulates the air past the lighting elements in the tree branches. The circulated air is drawn in the vents at one end of the tree trunk and expelled out the vents at the other end.

Each of these designs are well suited for indoor use where the accumulation of snow and other debris will not impede the flow of air through the tree base in providing the necessary cooling functions. Heretofore, however, no design robust enough to function in a harsh outdoor environment has been provided for a fiber optic Christmas tree stand. In particular, the cooling ability provided by the Christmas tree stand must be protected from the elements such that accumulated snow, blowing debris and other harsh environmental aspects present in a wintry environment do not impair the cooling efficiency of the stand.

Additional designs for outdoor lighted display stands are also needed that include various improvements to the airflow within the display stand and the resultant cooling function. In particular, variations in the placement of the airflow ports are needed so as to provide improved cooling ability for the electronic components within the display stand while still retarding the harsh environmental effects encountered when the stand is used in an outdoor environment.

Further, safety mechanisms involving the electrical components contained within display stands are needed. In particular, no lighted display stands have heretofore adopted a modular approach with respect to the replacement of the electronic components within the lighted display stands, for example, so as to easily replace a burned-out light bulb or other electrical component. When providing such a solution, the safety of the operator must be accounted for, particularly when performing the replacement in a wet or otherwise harsh environment. In certain aspects, such safety considerations may include lock-out and power-off functions that preclude the operator from contacting fully-powered electrical components.

SUMMARY OF THE INVENTION

In one major aspect of the invention, a Christmas tree stand is provided for having a base for supporting the stand above a ground level; and a shell having a lateral surface, the shell disposed atop the base so as to define an inner volume, the shell housing electrical components within the inner volume, the shell having a plurality of holes disposed on a top portion of the lateral surface, the holes providing ventilation between the inner volume and an outside environment, the shell having a flange overhanging the top portion of the lateral surface so as to shield the holes.

In a particularly preferred embodiment of the invention, the Christmas tree stand further includes a body including the lateral surface, the body having an upper rim and a plurality of notches cut from the lateral surface along the body at the upper rim; and a cover including a bottom surface and the flange, the cover disposed atop the upper rim of the body, the holes defined by the notches and the bottom surface of the cover.

In addition, the base and the shell of the Christmas tree stand base and the shell may all be constructed of molded plastic. In another preferred aspect of the invention, the cover further includes a receptacle for holding the Christmas tree. Further, the receptacle for the Christmas tree stand may further include an optically transparent cap disposed at a bottom of the receptacle, and the electrical components may include a lamp, a color wheel and a motor to rotate the color wheel. In this embodiment, the lamp, color wheel and optically transparent cap are disposed in optical alignment with each other so as to provide a light source at the bottom of the receptacle.

In yet another preferred aspect of the invention, the base of the Christmas tree stand includes an elevated surface and a support structure for supporting the elevated surface above the ground level, the elevated surface defining one surface of the inner volume. Further, the support structure may include a plurality of legs In yet another aspect of the invention, the base of the Christmas tree stand is shaped as a truncated frustum or includes a connector for providing an electrical coupling to the electrical components. In addition, the base may include a bottom surface disposed on the ground level, the bottom surface including a wire channel for accommodating wires for connection to the connector. Finally, the base of the Christmas tree stand may include a mounting for supporting the color wheel, the motor and the lamp within the inner volume.

In other particularly preferred embodiments, a stand is provided including a support system for supporting the stand; a shell coupled to the support system, the shell including an inner volume for housing electrical components; and a cover disposed atop the shell, the cover including an inner volume in contact with the inner volume of the shell, the cover extending beyond a lateral surface of the shell such that the cover has at least one hole disposed on a downward-facing surface of the cover, the hole providing ventilation between the inner volume of the shell through the inner volume of the cover and out to an outside environment, the cover including a receptacle configured to hold a fiber-optic decoration.

In particularly preferred aspects of this embodiment, the stand further includes an access door disposed on the shell for accessing the electrical components within the inner volume of the shell. The access door may include a safety mechanism that prevents the access door from being opened when electrical power is applied to the electrical components. Such safety mechanism may include an electrical access opening for accepting an electrical plug, the access door being prevented from opening to enable access to the electrical components when the electrical plug is inserted into the electrical access opening; or an electrical connector for accepting an electrical plug, the access door being prevented from opening to enable access to the electrical equipment when the electrical plug is inserted into the electrical connector; or an electrical lock that locks the access door, the access door being prevented from opening to enable access to the electrical equipment when power is applied to the electrical components; or an actuating switch that disconnects power to the electrical components when the access door is opened.

In still other embodiments of the invention, a stand is provided for holding a fiber-optic decoration including an access door disposed on the stand for accessing electrical components within an inner volume of the stand.

In yet other embodiments of the present invention a holder for mounting electrical components used within a decorative lighting system is provided including a safety mechanism that prevents the holder from being accessed within the decorative lighting system when electrical power is applied to the electrical components. In particular aspects of this embodiment, the safety mechanism includes an electrical lock that is activated when power is applied to the electrical components; or an actuating switch that disconnects power to the electrical components when the actuating switch is released.

DETAILED DESCRIPTION OF THE INVENTION

Figure 1:
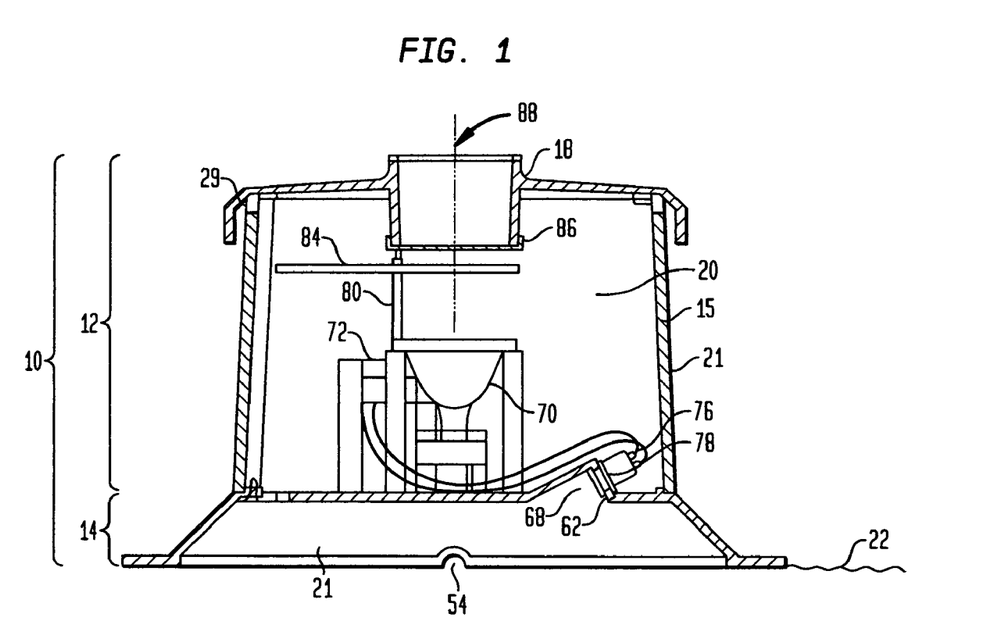
FIG. 1 is a sectional side view of the fiber optic Christmas tree stand according to one embodiment of the present invention.

Referring now to FIG. 1, a preferred embodiment of the fiber optic Christmas tree stand 10 according to the present invention is shown. In general, fiber optic Christmas tree stand 10 is comprised of a shell 12 and a base 14. As shown in the particular embodiment of FIG. 1, shell 12 includes cylindrical body 15 disposed atop base 14. Cover 18 is disposed atop body 15 so as to provide an enclosed inner volume 20. Enclosed inner volume 20 may be used, for example, to house the electrical components used in conjunction with the fiber optic Christmas tree (not shown).

Figure 2A:
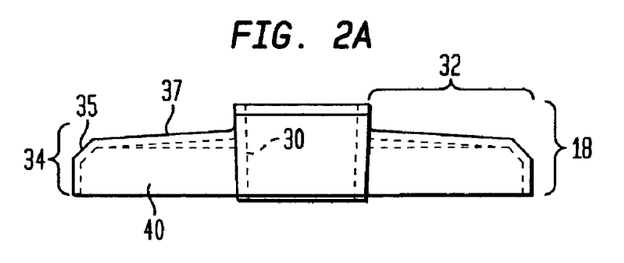
FIGS. 2A–2C are the side, bottom and top views respectively of the cover of the fiber optic Christmas tree stand according to one embodiment of the present invention.
Figure 2B:
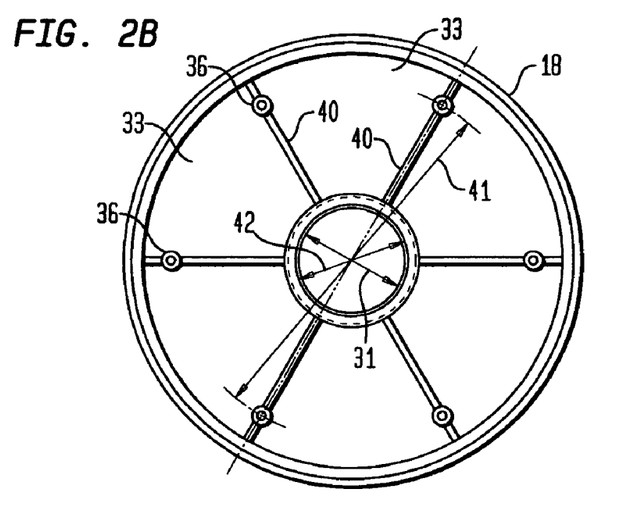
Figure 2C:
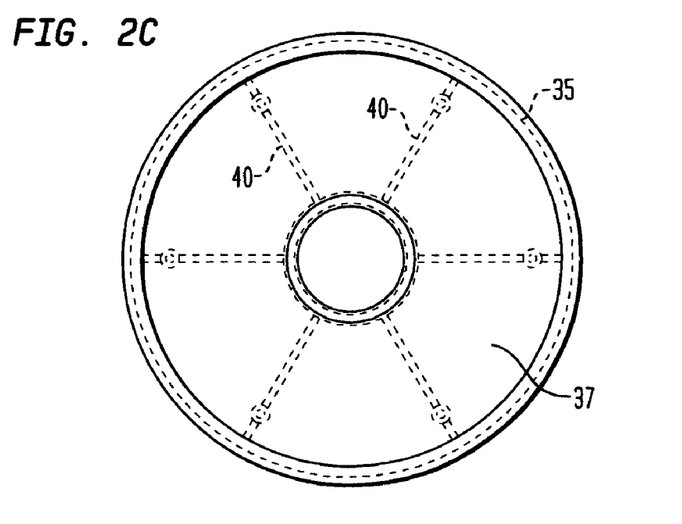

As shown more clearly in FIGS. 2A–2C, cover 18 is preferably formed as a single molded piece of plastic. The molded plastic cover includes a tapered central receptacle 30 into which the trunk of the artificial fiber optic Christmas tree may be inserted. The tapered nature of the receptacle provides a smaller diameter 31 at the bottom of the receptacle than the diameter 42 at the top of the receptacle so as to facilitate the insertion and securing of the artificial Christmas tree trunk in the cover 18. Cover 18 further includes a molded canopy 32 that extends radially outward from the central receptacle 30 and terminates at beveled edge 35. The upper surface 37 of canopy 32 is preferably slightly angled with respect to the horizontal ground level 22 shown in FIG. 1.

Extending from canopy 32 at the beveled edge 35 are downwardly projecting flanges 34 that are molded as part of cover 18. Support ribs 40 are also molded as part of the underside surface 33 of cover 18 to provide support for both the canopy 32 and the flanges 34. Underside surface 33 further provides an upper surface for enclosing inner volume 20 when cover 18 is disposed atop body 15. Support ribs 40 extend radially from receptacle 30 to the flanges 34 as shown in the embodiment of FIGS. 2A–2C. Screw securing holes 36 are also formed at the periphery of molded plastic ribs 40, preferably at an equal radial distance 41 from the central receptacle 30.

Figure 3A:
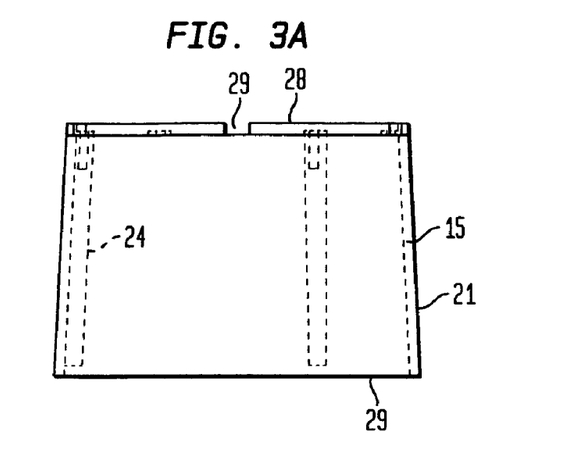
FIGS. 3A–3C are the side, top and bottom views respectively of the body of the fiber optic Christmas tree stand according to one embodiment of the present invention.
Figure 3B:
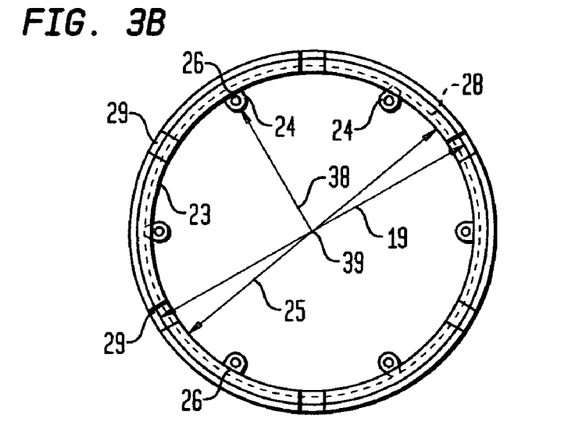
Figure 3C:
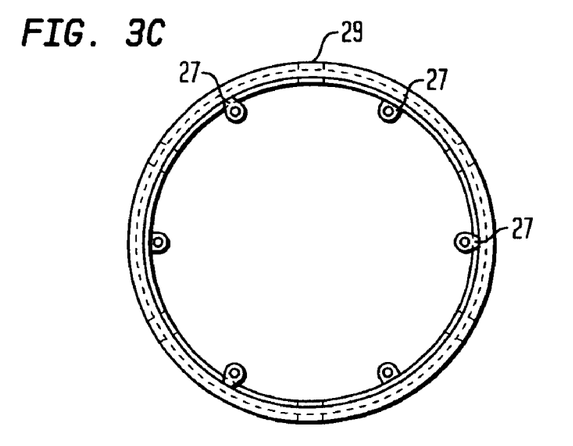

As shown in more detail in FIGS. 3A–3C, body 15 is also preferably formed from a ridged molded plastic. In the particular embodiment of FIGS. 3A–3C, body 15 is a cylindrical structure that has an outer body surface 21 having inner support ridges 24 disposed vertically on the inner body surface 23 of body 15. Inner support ridges 24 provide shear support for body 15 as well as having screw securing holes 26 within inner support ridges 24. Screw securing holes 26, disposed at radial distance 38 from center 39, are spaced and sized so as to be mateably aligned with screw securing holes 36 on cover 18 such that cover 18 and body 15 are matably engaged and connected with screws extending through these holes. Body 15 may be tapered slightly, therefore having an upper average diameter 25 smaller than a lower average diameter 19, so as to provide a more balanced support for the cover 18 and consequently the fiber optic Christmas tree.

Body 15 further includes upper ridge 28. Along upper ridge 28, notches 29 are cut from the upper ridge. Notches 29 may be physically cut from the molded plastic body 15 after the formation of the body, or alternatively, may be included as part of the cast molding for body piece 15. Notches 29 are disposed in a plurality of locations around the circumference of upper ridge 28. As shown in FIG. 1, notches 29 create holes joining inner volume 20 and the outside environment of the fiber optic Christmas tree stand when cover 18 is placed on body 15 and securely fastened thereto.

Figure 4A:
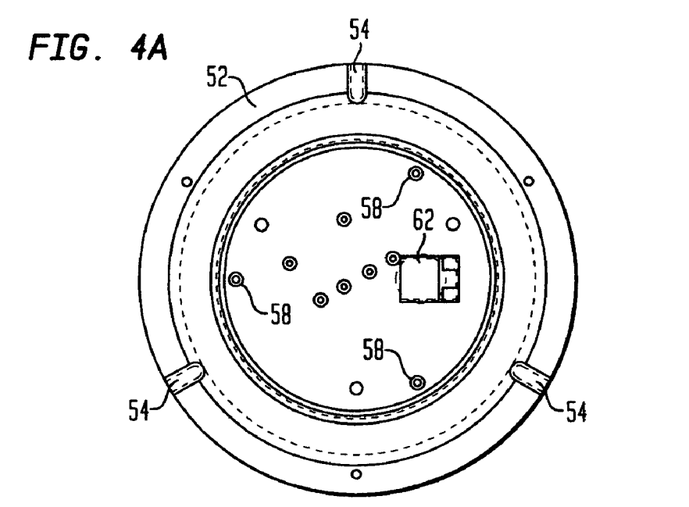
FIGS. 4A–4C are the top, bottom and side views respectively of the base of the fiber optic Christmas tree stand according to one embodiment of the present invention.
Figure 4B:
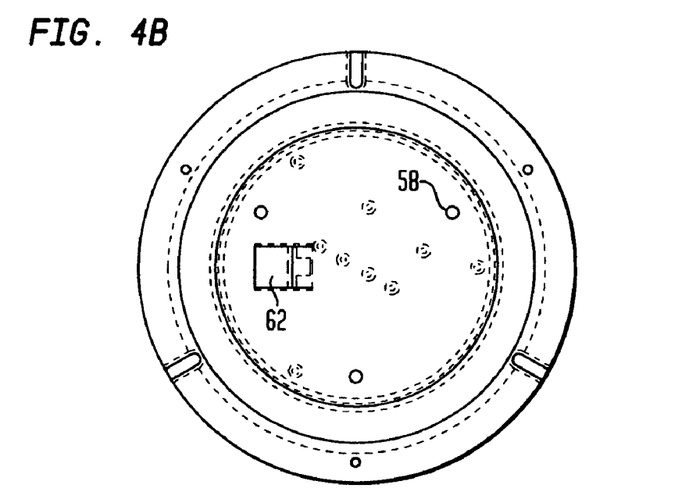
Figure 4C:
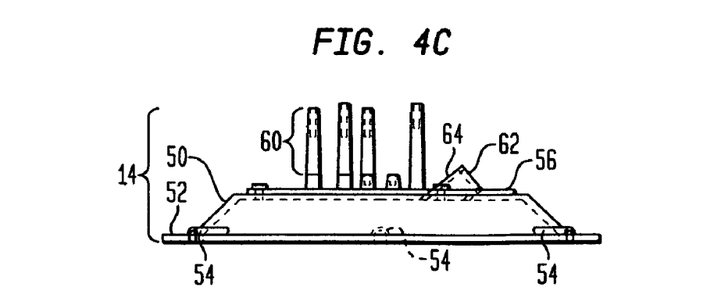

The base 14 of the fiber optic Christmas tree stand is shown in detail in FIGS. 4A–4C. In the preferred embodiment of FIG. 4 the base includes a conical frustum 50, again preferably manufactured from molded plastic. As part of frustum 50, rim 52 extends as a flange from the truncated frustum 50 providing contact with the ground level 22. Rim 52 has wire channels 54 that are constructed as semi-circular raised portions of rim 52 as shown in FIG. 1. Truncated frustum 50 further includes a support surface 56 on which the lower ridge 29 of body 15 rests. Base 14 is assembled to body 15 via screw securing holes 58 which are spaced and sized to be mateably engaged with screw securing holes 27 provided at the bottom of inner support ridges 24 on body 15. (FIG. 3c.)

Base 14 also includes mounting structure 60 partly consisting of formed plastic supports extending from upper surface 56 of base 14. Mounting structure 60 provides slots and screw securing holes for affixing the electrical components within inner volume 20 of the fiber optic Christmas tree stand. Also disposed on upper surface 56 is electrical connector 62. In the preferred embodiment shown in FIG. 4c, electrical connector 62 is disposed within a preformed angled portion 64 of upper surface 56. Preformed angled portion 64 provides clearance area 68, shown in FIG. 1, so as to provide space for connection to the electrical connector 62 beneath upper surface 56.

Screws are a preferred means for fastening body 15 to base 14 and cover 18 although other suitable fastening means may be used to engage these elements at mutual contact points on the pieces. For example, the base 14, body 15 and cover 18 may also be welded together at various weld joints around the upper and lower rims 28 and 29 respectively of body 15. As another example, snappable engagement mechanisms may be used to engage these pieces.

The electrical components disposed within inner volume 20 of the fiber optic Christmas tree stand 10 are shown in FIG. 1. In particular, lamp 70 and motor 72 are affixed to mounting structures 60 of base 14. Lamp 70 and motor 72 are connected to electrical connector 62 via wiring 76 terminating in electrical connector 78. Motor 72 is connected to a spindle 80 that is disposed vertically within fiber optic Christmas tree base 10. Spindle 80 terminates at the top with color wheel 84. The upper portion of spindle 80 may be fixably attached to the lower portion of cover 18 so as to provide a second connection point thereby maintaining a stable axis about which to rotate spindle 80. Also disposed at the bottom of receptacle 30 of cover 18 is optically transparent cap 86. Light generated by lamp 70 is projected upwards through rotating color wheel 84, through optically transparent cap 86, and on into receptacle 30 into which the base of fiber optic Christmas tree is placed. Lamp 70, color wheel 84 and optical transparent cap 86 are all disposed so as to be optically aligned along optical axis 88 so as to provide illumination to the fiber optic strands at the trunk of the fiber optic tree inserted into receptacle 30.

In operation, motor 72 drives spindle 80 to rotate color wheel 84. Illumination light emanating from lamp 70 passes through rotating color wheel 84 to provide light at the optically transparent cap 86. As the color wheel 84 rotates, monochromatic light from lamp 70 is filtered via different colored sections of color wheel 84 so as to provide different illumination colors of to impinge upon the fiber optic strands located at the base of the fiber optic tree inserted into receptacle 30.

Referring back to FIG. 1, enclosed inner volume 20 provides a protective, insulated environment, separate and distinct from the harsher outdoor environment outside the fiber optic Christmas tree stand, for housing the elementally sensitive electrical and mechanical components of the fiber optic system. In this regard, the electrical components, such at the lamp 70, the motor 72, and the rotating color wheel, 80 & 84, require a relatively moisture-free environment as well as proper ventilation for cooling these components. The above-described placement and construction of the fiber optic Christmas tree stand facilitates the protection and ventilation of these components in the required manner. For example, cover 18 has a sloped canopy 32 so that snow and other debris falling on the canopy easily slide off of the canopy onto the ground level 22. Further, overhanging flange 34 of cover 18 shields the holes formed by notches 29 and upper surface 37 from debris that is driven by the wind in a direction perpendicular to the outer body surface 21 of body 15 and prevents the debris and snow from entering the holes and plugging them up. Also, the holes formed by notches 29 and upper surface 37 provide venting holes that permit the heat generated by the electrical components within volume 20 to escape the fiber optic Christmas tree stand 10. Further, base 14 includes raised surface 56 so that the electrical components within volume 20 are elevated above ground level 22 which prevents debris and snow accumulating around the truncated frustum of base 14 from covering the portions of body 15 containing the electrical components. In particular, volume 21 within base 14, in combination with wiring channel 54, is provided underneath raised surface 56 so that electrical connection may be made to electrical connector 78 through electrical connector 62 without having the weight of the fiber optic Christmas tree stand bearing upon the electrical cords providing the electricity to the electrical components.

Fans and other cooling apparatus may also be disposed within volume 20 to assist in the circulation of air and the expulsion of heat through the holes formed by notches 29. Further, the holes may be formed by simply punching holes with outer body surface 21 of body 15, as opposed to the covering of notches 29.

Figure 5A:
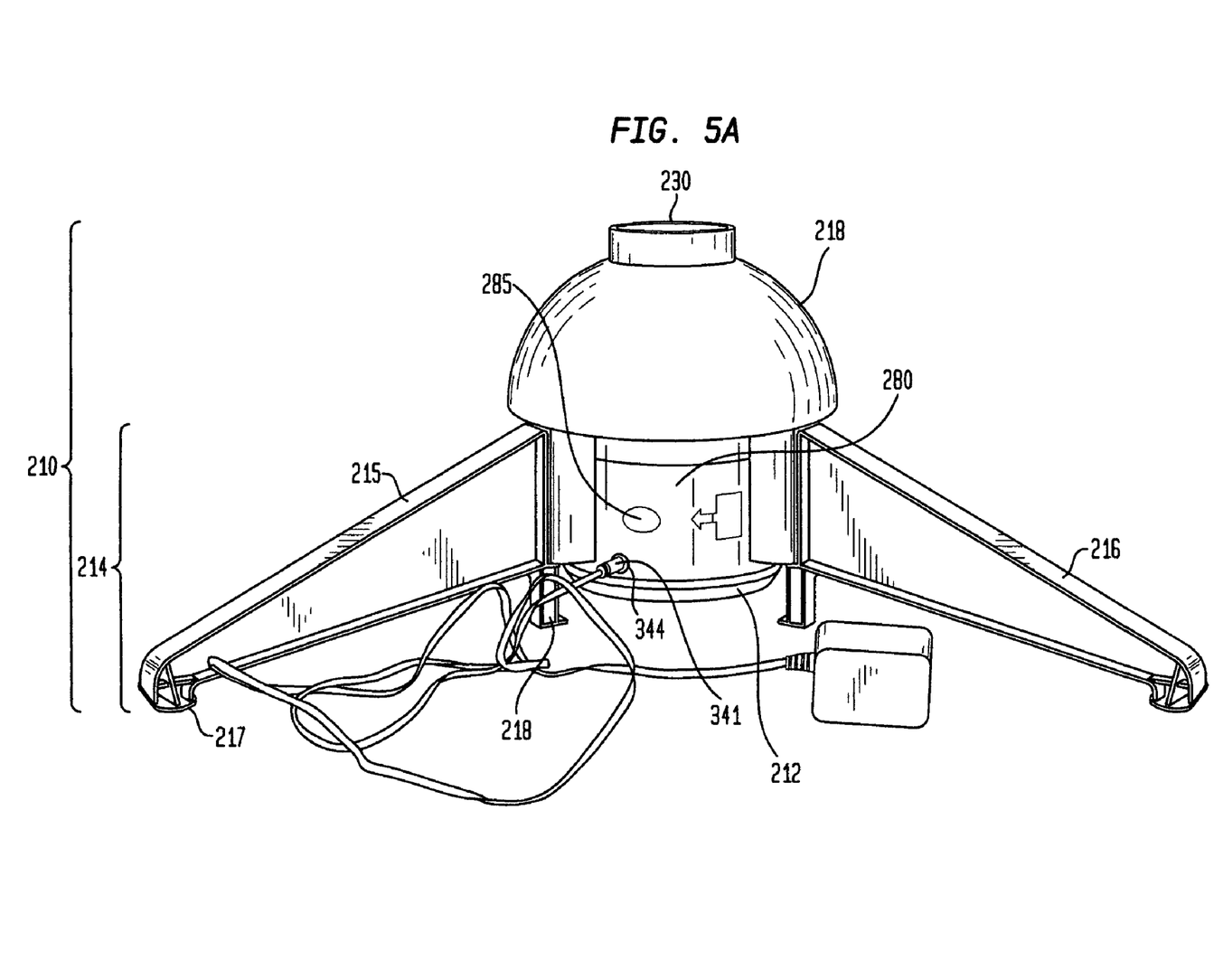
FIGS. 5A and 5B are side and bottom views respectively of a lighted display stand according to another embodiment of the present invention.

Referring now to FIG. 5A, another preferred embodiment of a fiber optic Christmas tree stand 210 is provided according to the present invention. As previously noted, the fiber optic Christmas tree stand 210 is comprised, generally, of a support system 214 coupled to a cylindrical shell 212. Further, a cover 218 is disposed atop shell 212 to provide a cover for the shell and a receptacle 230 for receiving a fiber optic or other lighted decoration.

The support structure 214 for the fiber optic Christmas tree stand may be composed of any known support structure that provides for sufficient ground clearance for the overall stand 210 such that the stand's base and associated bottom surface 213 remain safely above a ground level upon which the stand is resting. In the particular embodiment of FIG. 5A, the support system for the base consists of three radially-extending legs 215 and 216 (only two shown) which are secured to shell 212 via preformed, engageable slots within the shell. Feet 217 and 218 are formed as part of the legs so as to raise the entire structure above ground level.

Shell 212 may, in general, consist of molded plastic which safely houses and insulates the electrical components used to illuminate the lighted display. Shell 212 may be of any shape suitable for housing the electrical components while providing a stable support for the display. Shell 212 necessarily has an inner volume within which the electrical components are disposed. Cover 218 is mateably engaged with shell 212 so as to form a singular housing structure for the display. As shown in FIG. 5A, cover 218 is a three-dimensional, molded piece that has its own inner volume. The inner volume of the cover is disposed directly adjacent to and is thermodynamically coupled with the inner volume of shell 212.

Figure 5B:
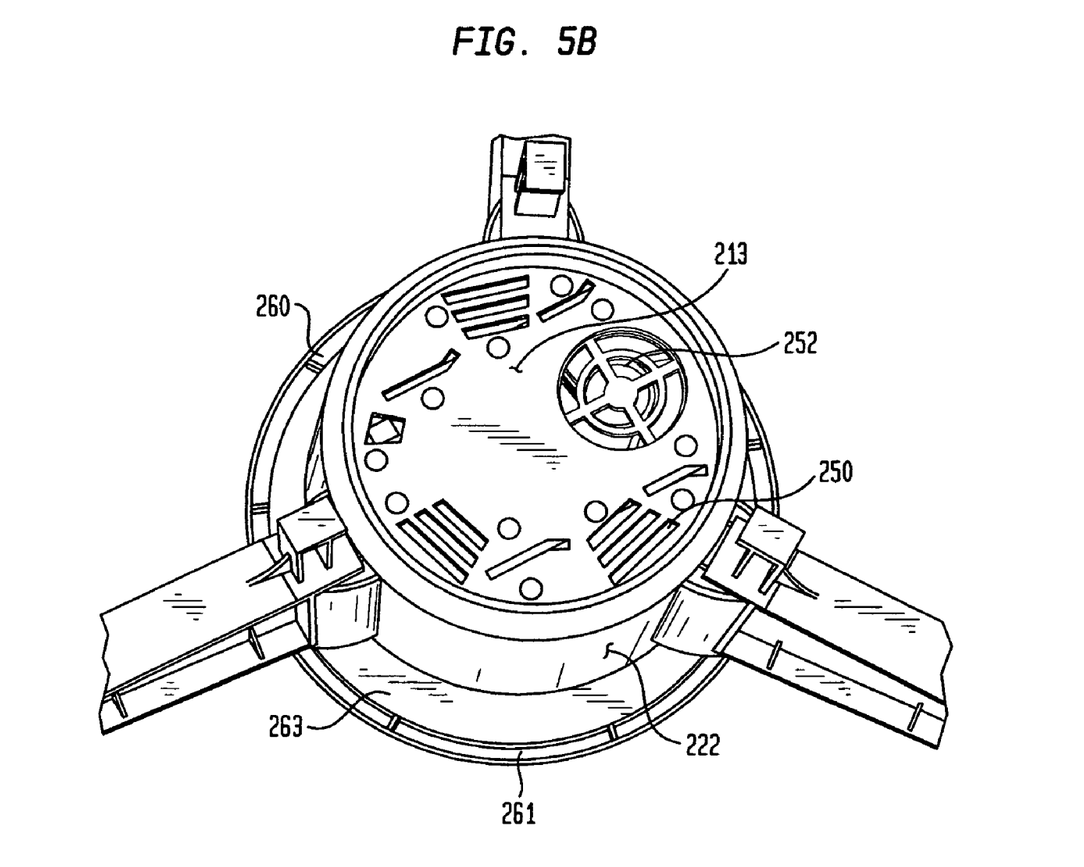

Referring to FIG. 5B, a bottom view of fiber optic stand 210 is provided. Vents 250 are provided on the bottom surface 213 to permit ambient air to enter the inner volume of shell 212. One of the electrical components within shell 212, i.e. fan 252, is provided to facilitate the circulation of air throughout the inner volume of shell 212. In the particular embodiment of the invention provided in FIG. 5B, cover 218, which is disposed on top and mateably engaged with shell 212, includes downward-facing ventilation slots 260, 261. Since the inner volume of shell 212 and the inner volume of cover 218 are thermodynamically coupled, slots 260 and 261 provide an exit port for the circulating air within the inner volumes of the shell and cover. It should be understood that the particular ports of airflow ingress and egress will depend on the direction in which the fan is circulating the air as well as other factors related to the ambient environment. Thus, properly designed, ventilation slots 260 and 261 could serve as the point of airflow ingress while vent 250 could serve as the point of airflow egress. In either case, the operation of the fan 252 causes ambient air to be drawn into the inner volumes of both the shell and the cover and circulated within them to cool the electrical components therein.

In one particularly preferred aspect, downward facing slots 260 and 261 are disposed on the bottom surface of a lip 263 of the circular cover 218. This cover lip is designed to extend beyond the lateral surface 222 of shell 212 and is designed to be at a sufficient height above ground level such that accumulating debris and snow around the lighted display base does not obstruct the slots. In this arrangement, i.e. where slots 260 and 261 serve as the point of airflow egress, additional advantages in the display base design are realized in that the heated air expelled from the inner volumes of shell 212 and cover 218 are directed downward to melt any snow or blow away any debris that has accumulated around the base. This self-clearing function is accentuated when numerous slots are provided along the lip of cover 218 so as to provide the greatest possible surface area of blowing coverage around the lateral surface 222 of shell 212 and to further ensure that even a partial blockage of one or more of the slots does not result in the complete obstruction of all expelled air from the display stand.

As further improvements to the above-described lighted display stand, certain conveniences and safety features may be included that facilitate the safe removal and/or replacement of internal electronic components without disrupting, moving or otherwise upsetting the stand's position and/or orientation. For example, present designs for lighted displays and fiber optic Christmas tree bases do not provide for an easy removal mechanism for accessing the electrical components therein. According to one particular embodiment of the present invention, FIGS. 6A, 6B, and 7 illustrate a module for holding the electrical components within fiber optic base 210.

Figure 6A:
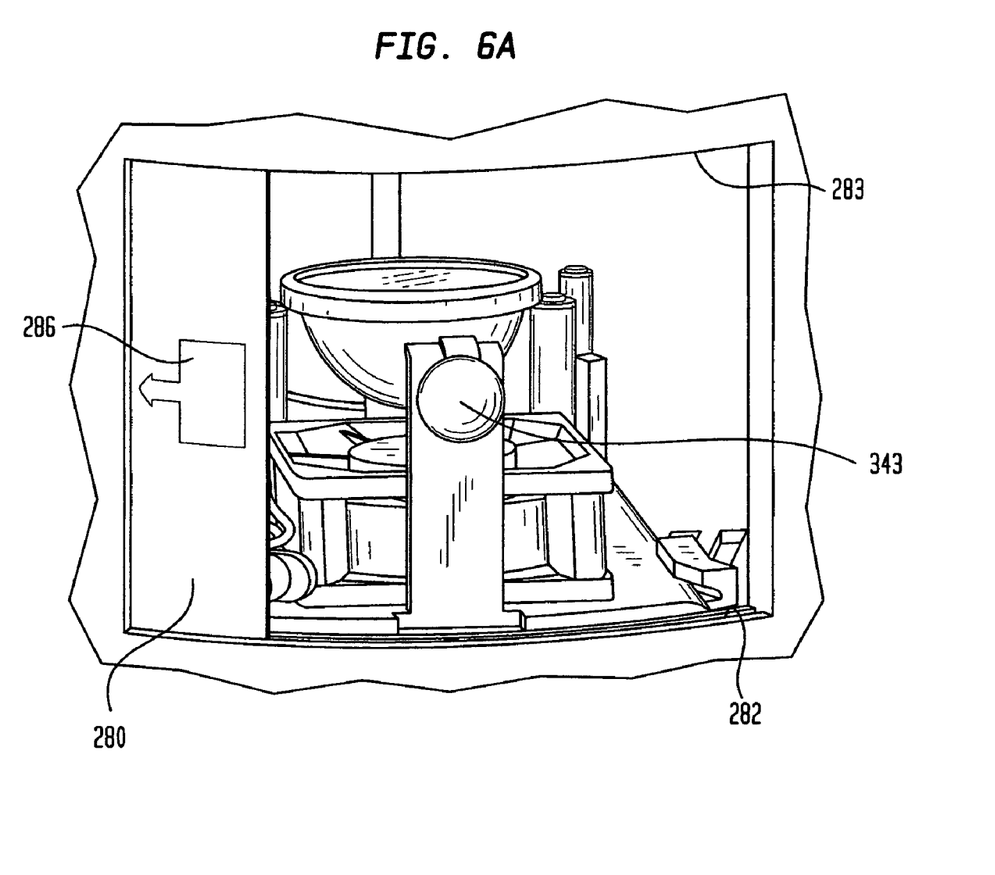
FIGS. 6A and 6B are operational views of the electronic parts module for a lighted display according to one embodiment of the present invention.
Figure 6B:
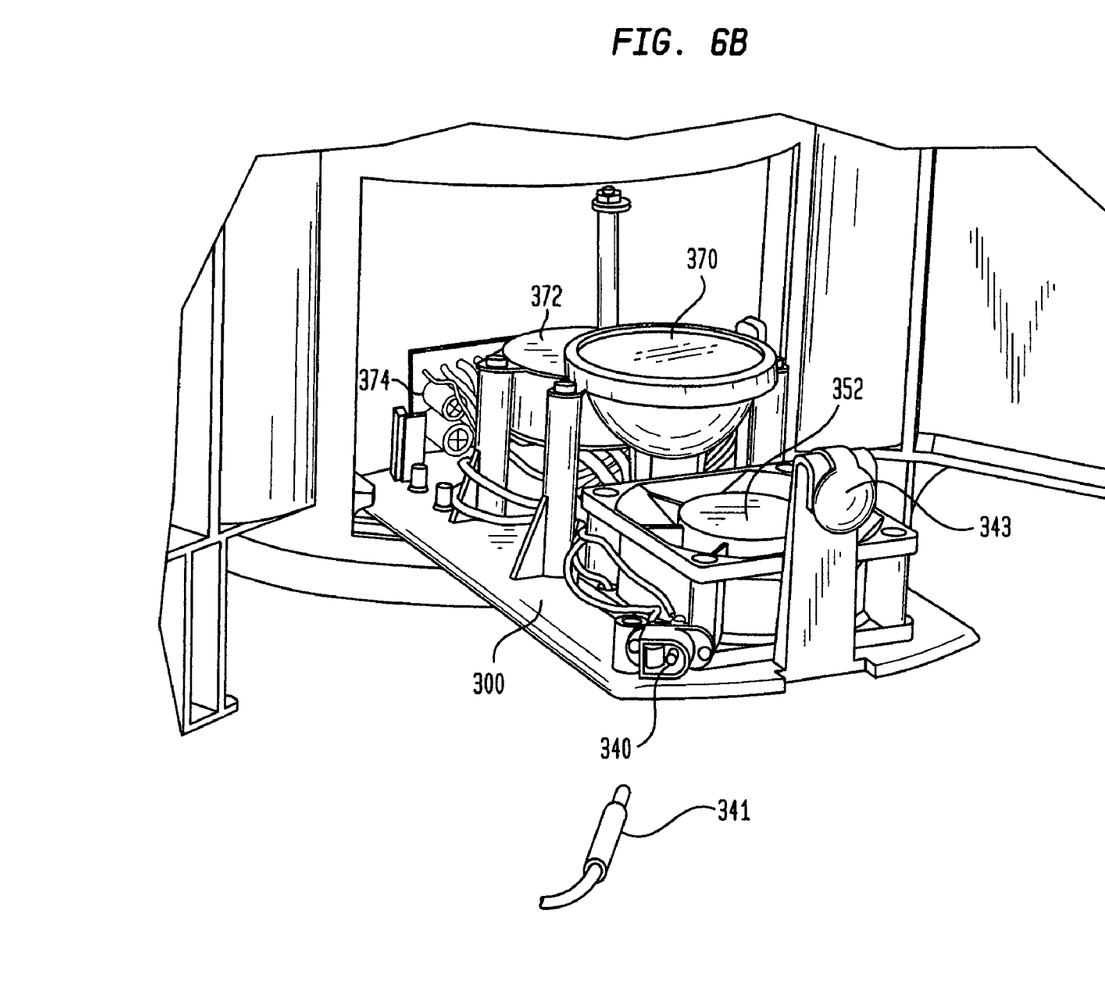

Referring to both FIGS. 6A and 6B, the electrical components within shell 212 are accessed through an access door 280. Access door 280 is slideably engaged with shell 212 along grooves 282 and 283 (not shown) so as to facilitate the movement of the door. Depression 285 (FIG. 5A) and finger tab 286 (FIG. 6A) are provided for assisting the user with the opening of access door 280. In particular, an operator pushes depression 285 inward toward the inner volume of shell 212 causing the left side of access door to slide back slightly into the volume along slideable grooves 282 and 283. Simultaneously, the user contacts finger tab 286 (FIG. 6A) and pushes access door radially along the circumferential direction of the shell's outer surface to slide the access door open. Thus, in its fully-closed position, access door 280 is flush with outer surface 222 of shell 212 and provides a seal with sufficient tolerance so that external debris, snow and other materials do not enter the inner volume of shell 212. In its fully opened position, access to the inner volume of shell 212 is provided and door 280, as shown in FIG. 6A, is slid to the left to a point at which finger grooves 286 are still exposed along the outer surface so as to permit the closure of the access door.

As shown in FIG. 6B, once access door 280 has been opened, access is provided to the electrical components within the lighted display or fiber optic Christmas tree stand. In the particular embodiment of FIG. 6B, a tray or electrical component mount 300 may be slid out to access the electrical components thereon. Although not shown in FIG. 6B, tray or holder 300 may include slideable engagement mechanisms along the bottom surface, counterparts for which are provided within the shell 212, such that the fully inserted component mount maintains a particular alignment and position within the inner volume of shell 212. Further, any one or portion of the numerous electrical components needed within the lighted display may be affixed to tray 300.

Figure 7:
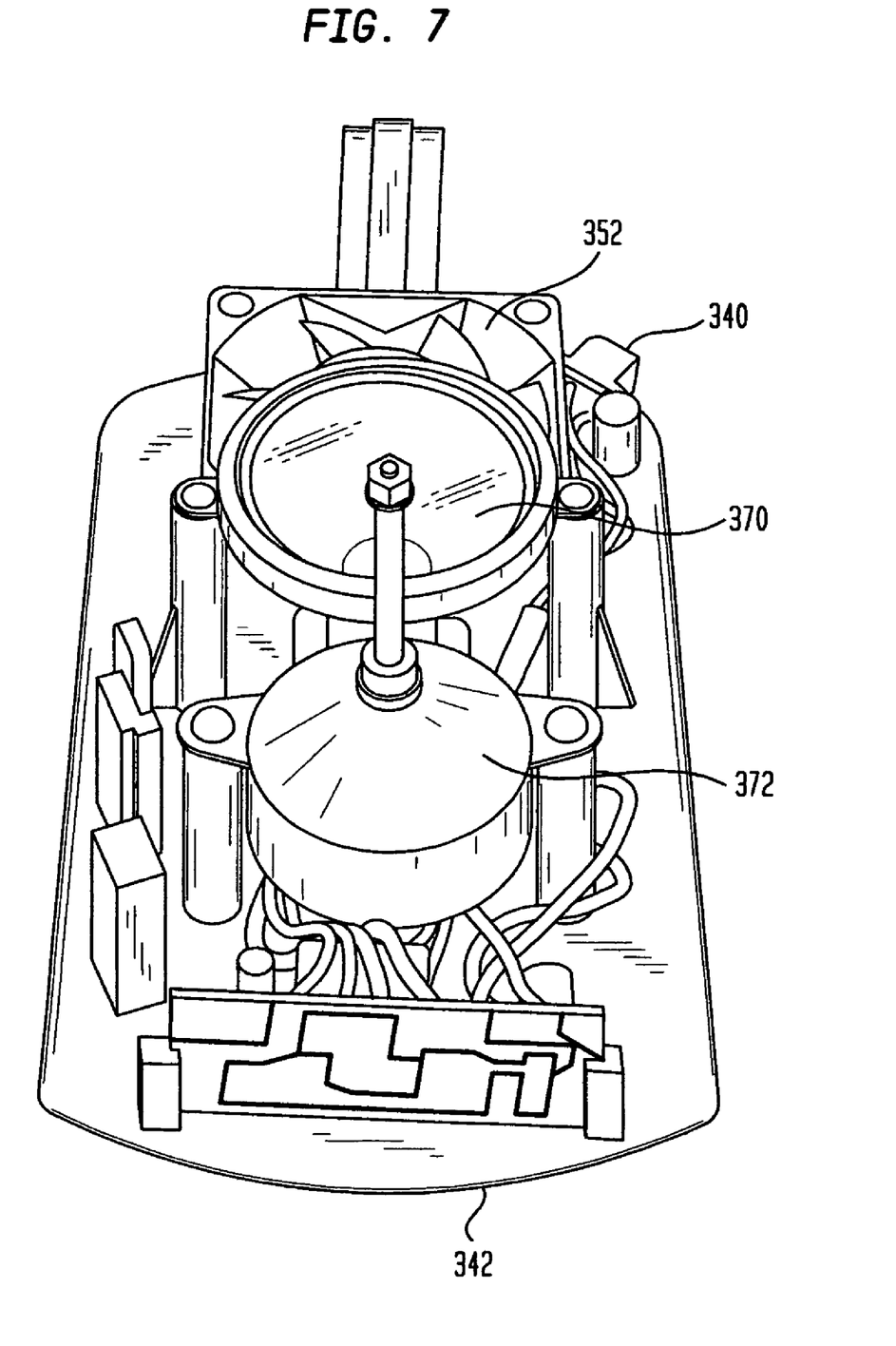
FIG. 7 is a top perspective view of the electronic parts module for a lighted display according to one embodiment of the present invention.

According to one aspect of the present invention provided in FIGS. 6B and 7, and in particular with respect to a fiber optic Christmas tree stand, certain specific electrical components are shown mounted to the tray. In this embodiment, such electrical components include a lamp 370, a fan 352 and a color wheel motor 372 and various other circuitry on a printed wiring board 374 for interconnecting and operating these primary electrical components.

Electrical interconnection between the electrical components mounted on tray 300 and the electrical power supply for those components may be made via one of any number of electrically safe and reliable connection methods. As shown in FIGS. 6B and 7, electrical connector 340 is provided so that an external plug and transformer may be electrically coupled to the inserted connector to provide power to the electrical components on the tray. It should be realized that although this is one preferred way to provide electrical power to the components within the lighted display, other electrical connectors that are well-known in the electrical connection arts may be used. For example, a circuit board edge connector may be attached along tray edge 342 (FIG. 7). This board edge connector would engage with a mating connector disposed within the inner volume of shell 212 so as to provide electrical connection to the other electrical components and to the power supplies, whether they are within or without the shell. Regardless of the electrical connection mechanism, however, one particularly preferred embodiment of the present invention includes a tray or holder which is entirely removable from shell 212 for cost-effective, labor-efficient and convenient replacement of either one or more of the electrical components on the tray. In this arrangement, the entire tray may be economically and conveniently replaced, if any one of the electrical parts burns out or becomes otherwise unusable. Advantageously, this replacement would be performed without disrupting or moving the lighted display base.

Figure 8:
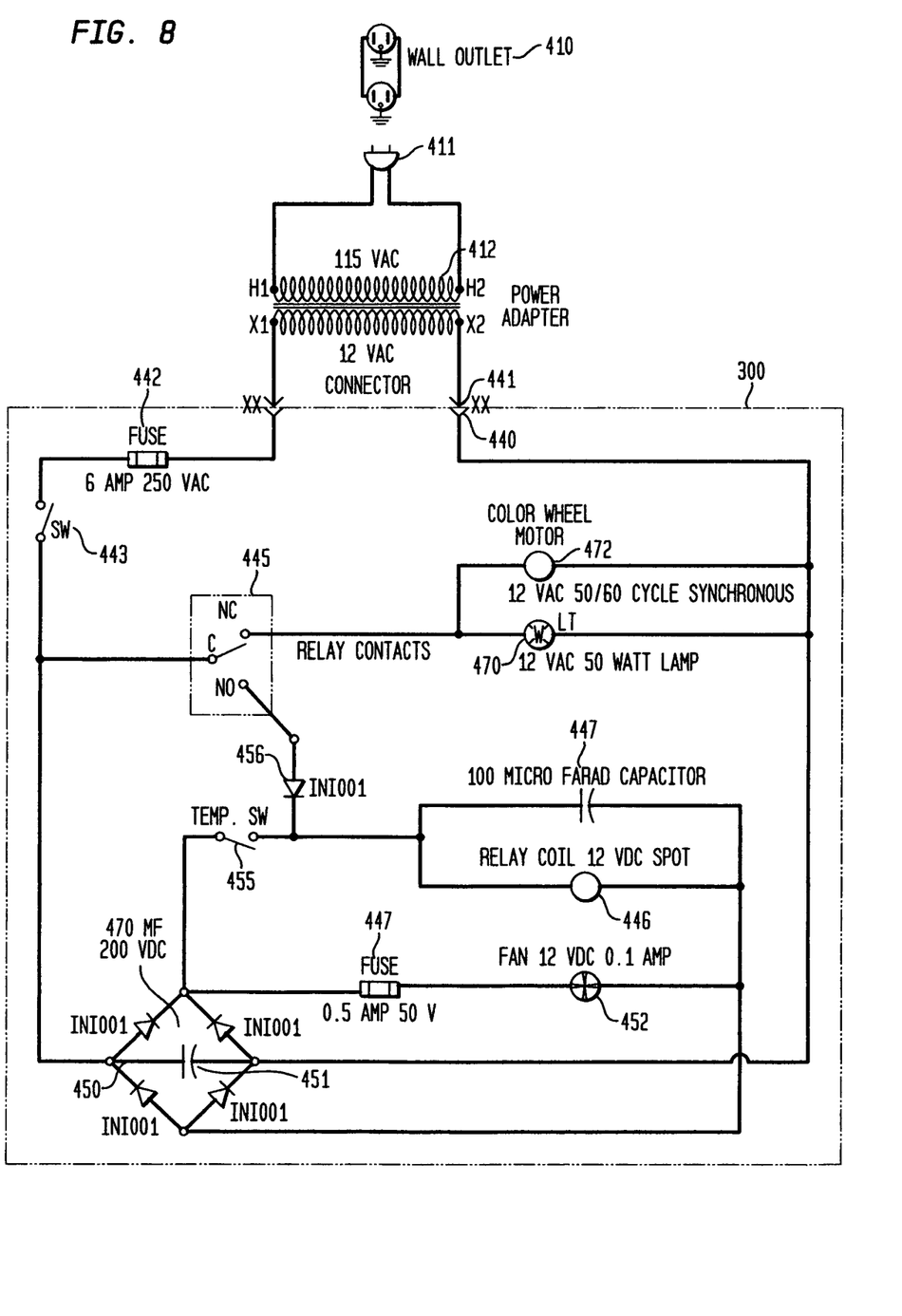
FIG. 8 is a schematic of the electrical components contained in the parts module for a lighted display according to one embodiment of the present invention.

Referring now to FIG. 8, a schematic of electrical components mounted to tray 300 is provided according to one particularly preferred embodiment of the invention. In this arrangement, the 120V AC power provided at wall outlet 410 and through plug 411 is transformed to 12V AC power with transformer 412. Electrical connection to the components on tray 300 is provided by mating connectors 440 and 441 (corresponding to connector 340—FIG. 7—and 341—FIG. 5A-respectively). Thus the tray, which acts as a mounting base for all the electrical components, has a single point of electrical contact with the power supply through connectors 440 and 441 and the power to the components may be shut off with a simple disconnection of the power source.

In operation, 12V AC power is applied to the circuit shown in FIG. 8 through fuse 442 and safety switch 443. Access door safety switch 443, however, is closed when the electrical components are safely housed and configured as described in more detail below. Diode bridge 450 is energized by the application of power and provides a full-wave rectification and conversion of the 12V AC power to 12V DC power. Smoothing capacitor 451 is included to shape and smooth the resultant 12V DC waveform. Normally open thermal safety switch 455 prevents the energization of relay coil 446, while 12 V DC is provided through fuse 447 to drive fan 452. Finally, during normal operation, relay 445 connects the common relay terminal (C) to the normally closed (NC) terminal to provide unrectified 12V AC power to lamp 470 and color wheel motor 472.

When thermal overheating of the electrical components occurs, normally open thermal switch 455 closes so as to energize relay coil 446. This causes the relay to switch the common terminal (C) to connect to the normally open (NO) terminal such that power is removed from lamp 470 and fan 472. Diode 456 provides for half-wave rectified 12V power to be continuously applied to relay coil 446 in this instance, even if the thermal condition which caused switch 455 to close is removed and the switch reverts to its normally open position. Capacitor 447, connected across the relay coil, acts to smooth the half wave DC current to force the relay to stay closed. Thus, following a thermal overheating condition, the primary electrical components (except the fan) on the tray 300 remain off. This stage persists until the user disconnects the 12V AC power to diagnose the source of the thermal overload and resets relay coil 446 and relay 445.

According to one safety aspect of the present invention, access door safety switch 443 (shown as circular contact button 343 in FIGS. 6A and 6B) is provided to prevent energization of any of the electrical components on tray 300 when the access door is open. In normal operation of the lighted display stand, the back of the access door 280 contains a plastic latch, ramp or other contact surface that pushes button 343 back into the inner volume of shell 212 when the access door is closed. Upon opening the access door beyond a certain point, the button extends outward thereby opening the access door safety switch 443 and removing power from all the electrical components on the electrical mounting board 300. This prevents a user from contacting energized and moving electrical components during the removal and servicing of the tray and its components.

According to another safety aspect of the present invention, access door 280 includes an electrical access opening or port, 344 through which connector 341 is placed to make electrical connection to complementary connector 340 on tray 300. The electrical access port is placed close to the leading edge of the access door which is first to be slid behind the side surface 222 of shell 212. With this configuration, the access door is prevented from opening when the connector, and therefore power, is applied to the electrical components in the lighted display stand.

It should be noted that those of skill in the art will realize numerous variations in which the electrical connector that supplies the power to the system prevents the opening of the access door until the power is unplugged. In particular, the access door itself may have the connector on it (as differentiated from an access hole for insertion of the external connector). In addition, the electrical access port may be located off the access door on the side surface 222 of shell 212 just behind the leading edge of the access door. In this arrangement, the access door would be obstructed from opening in a similar manner as described above.

Those of skill in the art will also recognize that numerous other safety mechanisms may be employed to prevent access to the energized circuitry. For example, an electrically energized lock may be employed on the tray 300 that clasps the access door shut so long as power is applied to the lighted display. In this arrangement, as with the thermal safety fuse, the power would have to be removed from the circuitry in order to open the access door and access the electrical components. Other electrical safety mechanisms are similarly contemplated by the present invention.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention. In particular, the embodiments described herein may be used to support any type of outdoor decoration that uses an associated light or electrical equipment and for which protection from the outdoor environment is required for those components while still proving adequate ventilation within the support.

What is claimed is:

1. A stand comprising:
a receptacle for holding a fiber-optic holiday decoration;
an access door disposed on said stand for accessing electrical components within an inner volume of said stand and a safety mechanism that prevents said access door from being opened when electrical power is applied to said electrical components wherein said safety mechanism is an electrical access opening for accepting an electrical plug, said access door being prevented from opening to enable access to said electrical components when said electrical plug is inserted into said electrical access opening.

2. The stand according to claim 1 wherein said safety mechanism is an electrical lock that locks said access door, said access door being prevented from opening to enable access to said electrical equipment when power is applied to said electrical components.

3. A stand comprising:

a support system for supporting said stand;

a shell coupled to said support system, said shell including an inner volume for housing electrical components; and a cover disposed atop said shell, said cover including an inner volume in contact with said inner volume of said shell, said cover extending beyond a lateral surface of said shell such that said cover has at least one hole disposed on said cover, said hole providing ventilation between said inner volume of said shell through said inner volume of said cover and out to an outside environment, said cover including a receptacle configured to hold a fiber-optic decoration;

an access door disposed on said shell for accessing said electrical components within said inner volume of said shell; said access door including a safety mechanism that prevents said access door from being opened when electrical power is applied to said electrical components; said safety mechanism is an electrical access opening for accepting an electrical plug, said access door being prevented from opening to enable access to said electrical components when said electrical plug is inserted into said electrical access opening.

4. A stand comprising:

a support system for supporting said stand;

a shell coupled to said support system, said shell including an inner volume for housing electrical components; and a cover disposed atop said shell, said cover including an inner volume in contact with said inner volume of said shell, said cover extending beyond a lateral surface of said shell such that said cover has at least one hole disposed on said cover, said hole providing ventilation between said inner volume of said shell through said inner volume of said cover and out to an outside environment, said cover including a receptacle configured to hold a fiber-optic decoration;

an access door disposed on said shell for accessing said electrical components within said inner volume of said shell; said access door including a safety mechanism that prevents said access door from being opened when electrical power is applied to said electrical components; said safety mechanism is an electrical lock that locks said access door, said access door being prevented from opening to enable access to said electrical equipment when power is applied to said electrical components.

* * * * *